United States Patent [19]
Shaw et al.

[11] 3,847,699
[45] Nov. 12, 1974

[54] METHOD OF FORMING SIMULATED STITCHES

[75] Inventors: Donald L. Shaw, North Syracuse, N.Y.; Lawrence D. McLaughlin, Warren, Mich.

[73] Assignee: General Motors Corporation, Detroit, Mich.

[22] Filed: Nov. 8, 1972

[21] Appl. No.: 304,860

[52] U.S. Cl............... 156/251, 156/298, 156/515, 161/119
[51] Int. Cl....................... B32b 31/18, B32b 31/20
[58] Field of Search .......... 156/251, 515, 298, 219, 156/220; 12/32; 161/116, 117, 119

[56] References Cited
UNITED STATES PATENTS

| | | | |
|---|---|---|---|
| 3,758,358 | 9/1973 | Kuroda | 156/251 |
| 2,729,010 | 1/1956 | Markus et al. | 156/251 |
| 2,321,740 | 6/1943 | Flint | 156/298 |
| 2,994,360 | 8/1961 | Shaw et al. | 156/251 |
| 3,219,506 | 11/1965 | Dusina, Jr. et al. | 156/220 |
| 2,546,553 | 3/1951 | Majtner | 12/32 |

*Primary Examiner*—Charles E. Van Horn
*Assistant Examiner*—M. G. Wityshyn
*Attorney, Agent, or Firm*—Edward J. Biskup

[57] ABSTRACT

A method of forming a simulated stitch pattern on a base sheet of thermoplastic material by using a heated die blade which serves to cut a plurality of stitch sections from a cover sheet of thermoplastic material and bond the stitch sections to the base sheet.

3 Claims, 8 Drawing Figures

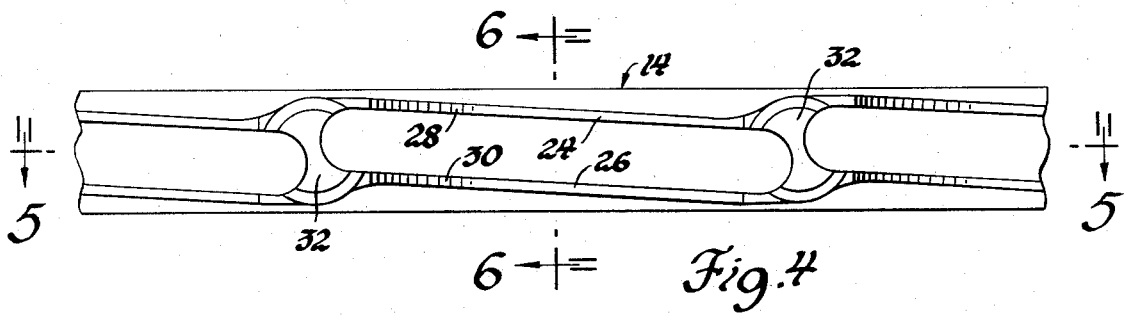
Fig. 4
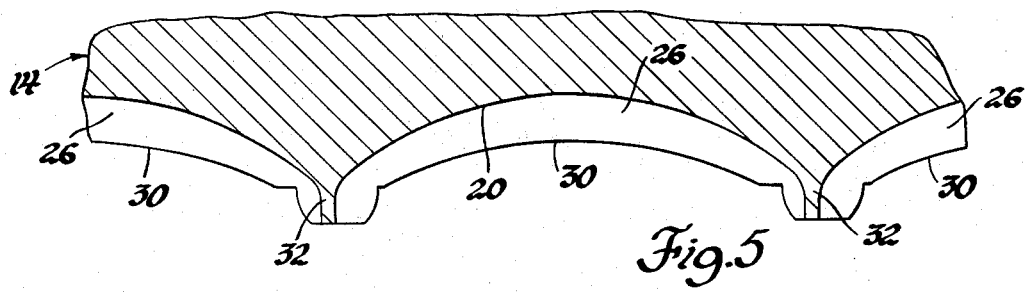
Fig. 5
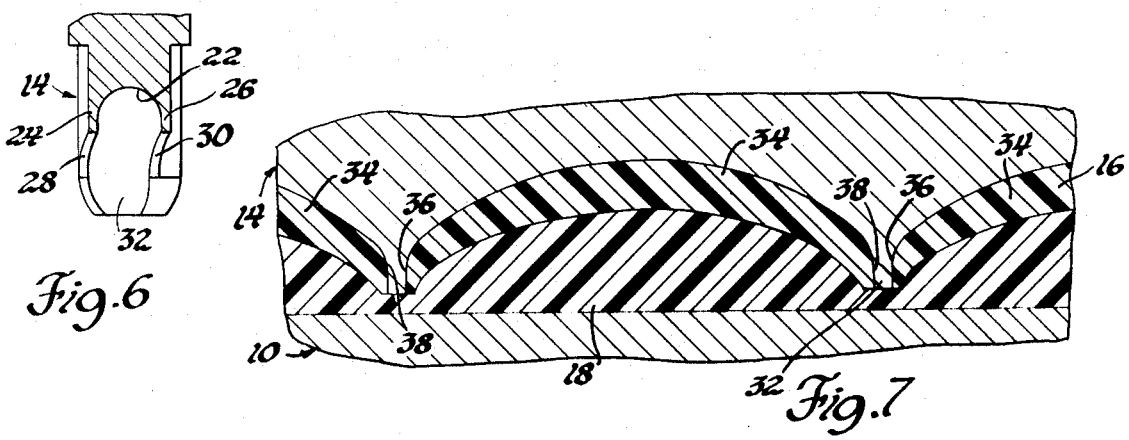
Fig. 6
Fig. 7
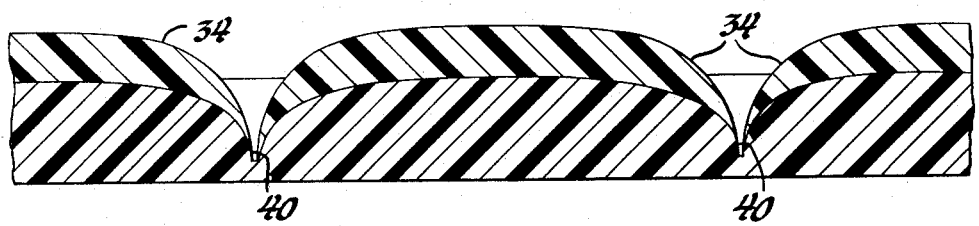
Fig. 8

METHOD OF FORMING SIMULATED STITCHES

The plastic trim material used for covering seats and other parts of an automobile interior is frequently embossed with various patterns and designs so as to enhance its decorative appearance. In addition, simulated stitches have been embossed into the plastic sheets in order to give the observer the impression that the sheets of trim material are machine-sewn rather than fusion bonded. In most cases, stitches are dielectrically formed into the exposed surface of the plastic sheet using a die blade which is pressed directly into the surface of the sheet. Although relatively good stitch patterns have been realized using this method, it has not been possible to completely duplicate an exact stitch design. It is believed that one reason for this difficulty may be due to the fact that the die blade tends to depress the stitch pattern below the upper surface of the cover sheet and therefore the simulated stitches are not raised above the surface as is the case with actual stitches. Apart from this difficulty, another problem with the present embossing method is that, inherently, the simulated stitches are always the same color as the color of the base sheet and therefore they cannot have the distinctive appearance stylists frequently find desirable in certain trim color combinations.

The present invention is directed to a method of forming simulated stitches on a thermoplastic base sheet in a manner which allows the stitches to not only be raised above the surface of the base sheet but, in addition, be of a contrasting color if so desired. In the preferred form this method consists of placing a base sheet of thermoplastic material on the flat bed of a hot platen press. A cover sheet of thermoplastic material which can be of a contrasting color, is then laid on the base sheet and a heated die blade having a stitch pattern formed therein is then pressed into the cover sheet. The die blade serves to cut discrete elongated stitch sections out of the cover sheet and embed the end portions of each stitch section into the base sheet. Simultaneously, each stitch section is bonded along its length to the base sheet and thereafter the cover sheet is removed from the base sheet so as to reveal the simulated stitches.

The objects of the present invention are to provide a method of forming simulated stitching on a trim sheet of thermoplastic material; to provide a method of forming a plurality of stitch sections on a base sheet with each stitch section being raised above the surface of the base sheet and having the opposite ends of each stitch section embedded into the base sheet without being exposed on the opposite side thereof; to provide a stitch pattern which has a plurality of aligned discrete elongated stitch sections bonded to the upper surface of a base sheet with the opposite ends of each stitch section located in apertures formed in the base sheet; to provide a method of cutting discrete stitch sections from a cover sheet and bonding the stitch sections to a base sheet along a straight line; to provide a method of forming simulated stitches on a base sheet with a heated die blade which serves not only to cut stitch sections of discrete length but also serves to bond the stitch sections along their lengths to the base sheet; and to provide a method of simultaneously forming a plurality of stitch sections on the top surface of a thermoplastic base sheet with the stitch sections being a color contrasting with the color of the base sheet.

Other objects and advantages of the present invention will be apparent from the following detailed description when taken in conjunction with the drawings in which;

FIG. 4 is a view taken on line 4—4 of FIG. 1 and shows the stitch pattern formed in the lower end of the die blade;

FIG. 5 is a view taken on line 5—5 of FIG. 4;

FIG. 6 is a cross-sectional view taken on line 6—6 of FIG. 4;

FIG. 7 is an enlarged cross-sectional view taken on lines 7—7 of FIG. 2 and shows the die blade pressed into the two sheets of thermoplastic material and;

FIG. 8 is a view taken on line 8—8 of FIG. 3 and shows the completed simulated stitches formed on the lower sheet.

Figure 1:
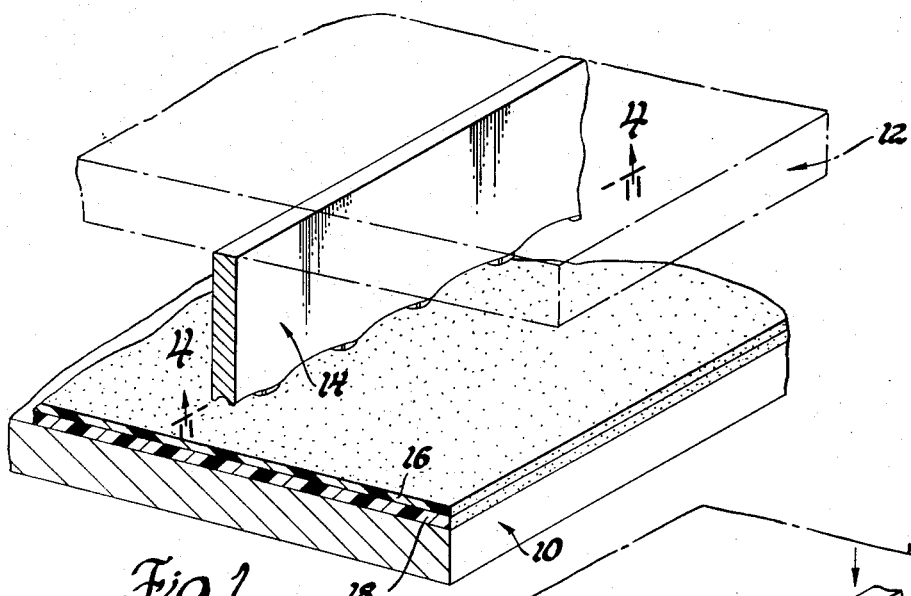
FIG. 1 is a perspective view showing the lower platen of a press supporting a pair of thermoplastic sheets prior to being engaged by a die blade having a stitch pattern formed in the lower end thereof.

Referring to the drawings and more particular FIG. 1 thereof, a press is shown comprising a lower platen 10 and an upper platen 12. The upper platen 12 is shown in phantom lines and, as is conventional, is supported for movement along a vertical axis by means not shown. An elongated die blade 14 has its upper end rigidly connected to the upper platen 12 and is adapted to be moveable thereby between the raised position shown in FIG. 1 and a lowered position shown in FIG. 2. It will be understood that suitable pressure applying means such as a hydraulic cylinder can be utilized for moving the upper platen 12 between the aforementioned positions.

The lower platen 10 supports a pair of overlapping sheets 16 and 18 made of thermoplastic material with the upper or cover sheet 16 being slightly thinner than the lower or base sheet 18. Each sheet 16 and 18 is of uniform thickness throughout and is made from a thermoplastic such as polyvinyl-chloride.

The die blade 14 used for practicing this invention is made from a metal such as stainless steel and as seen in FIGS. 4, 5 and 6 has a series of elongated stitch designs formed in the lower surface thereof. Each stitch design is defined by a cavity formed in the lower surface of the die blade. The cavity is curved in the longitudinal as well as the transverse direction and is defined by base curves 20 and 22 and laterally spaced side walls 24 and 26 which respectively terminate with laterally spaced and parallel cutting edges 28 and 30 which are curved in the longitudinal direction. The opposite end portions of each stitch design is also curved and formed by downwardly extending projections 32 which serve to separate one stitch design from the other. It will be noted that each stitch design is located along an axis that is tilted relative to the longitudinal axis of the die blade 14. This arrangement causes the adjacent end portions of the stitch designs to be offset relative to each other as shown in FIG. 4. In addition it will be noted that each base curve 20 and 22 as well as each cutting edge 28 and 30 is a segment of a circle. In this regard, one die blade used for practicing the invention had a width dimension of .044 inches and had a base curve 20 which was a segment of a circle having a radius of .120 inches while the base curve 22 was a segment of a circle having a radius of .010 inches. Also, each cutting edge was a segment of a circle having a radius of .145 inches and the distance between the centers of adjacent projections was .1666 inches. In addition, the thickness of each projection at its center and as seen in cross section in FIG. 5 was .004 inches and the above mentioned axis was tilted approximately 3½° relative to the longitudinal axis of the die blade 14. The die blade having stitch designs with the aforesaid dimensions was used with a base sheet and cover sheet which were respectively .040 inches and .025 inches in thickness.

Figure 2:
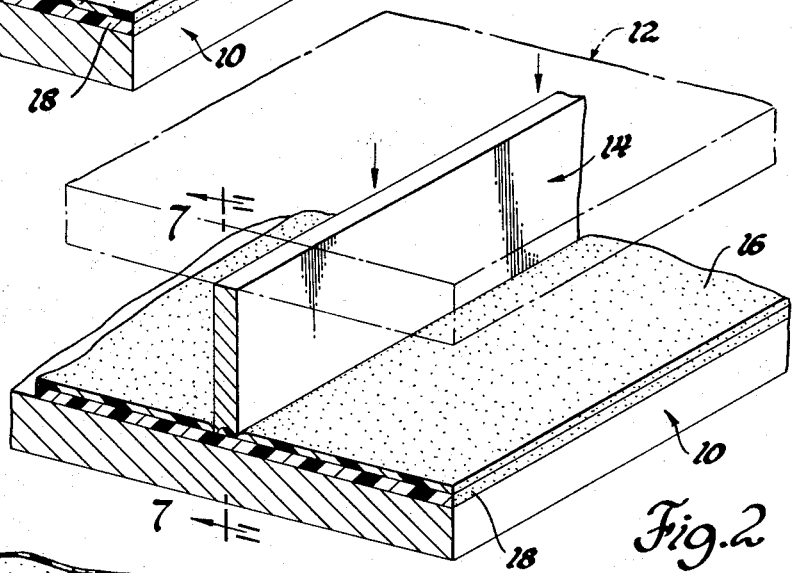
FIG. 2 is a view similar to FIG. 1 with the die blade pressed into the top or cover sheet of thermoplastic material.

In practicing the invention, initially the base sheet 18 is placed on the lower platen 10 and then covered with the cover sheet 16 in the area directly below the die blade 14 where the simulated stitches are to be formed on the base sheet 18. If desired the cover sheet 16 can be of a contrasting color relative to the color of the cover sheet 16 so the stitch pattern formed is more noticeable and distinctive. After the sheets 16 and 18 are positioned as shown in Fig. 1, the die blade 14 is heated in a conventional manner such as by a resistance type heater to a temperature between 300° F and 350° F. The upper platen 12 is then lowered so as to cause the die blade 14 to be pressed into the upper surface of the cover sheet 16 as seen in FIG. 2. A pressure of 10 pounds per square inch is applied to the sheets for approximately 7–10 seconds and during this time the base sheet 18 is compressed by the die blade 14 as seen in FIG. 7.

As seen in FIGS. 7 and 8, it will be noted that as the die blade 14 is lowered into engagement with the cover sheet 16, the cutting edges 28 and 30 including the projections 32 cut through the cover sheet 16 and thereby form a plurality of discrete identical stitch sections 34 out of the cover sheet. Each stitch section 34 is compressibly engaged with the upper surface of the base sheet 18 and the projections 32 cause the opposite end portions 36 and 38 of each stitch section 34 to be embedded into apertures 40 formed by the projections 32 in the base sheet 18. It will also be noted that the heated die blade 24 causes the lower surface of each stitch section 34 to be fused to the top surface of the base sheet 18.

Figure 3:
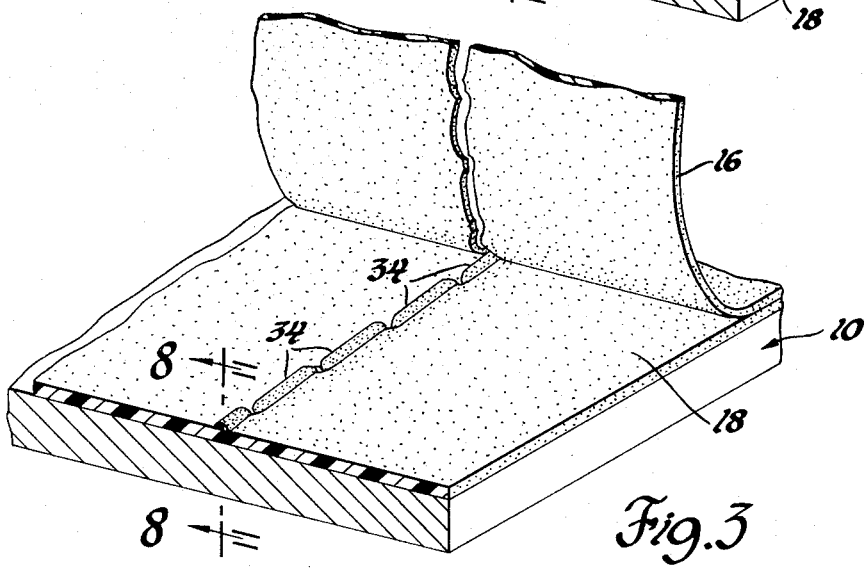
FIG. 3 shows the top or cover sheet of thermoplastic material being removed from the lower sheet so as to expose the simulated stitches formed by the die blade.

After the cut and bond cycle is completed as described above, the upper platen 12 is raised or returned to the position of FIG. 1. Thereafter the cover sheet 16 is removed from the base sheet 18 revealing the stitch pattern shown in FIGS. 3 and 8. In this regard, it will be noted that the base sheet 18 and the stitch section 34 expands to its normal uncompressed state and the end portions 36 and 38 of adjacent stitch sections are embedded in the apertures 40 formed in the base sheet 18.

Various changes and modifications can be made in this method without departing from the spirit of the invention. Such changes and modifications are contemplated by the inventors and they do not wish to be limited except by the scope of the appended claims.

We claim:

1. A method of forming simulated stitching on a base sheet of thermoplastic material, comprising the steps of positioning a cover sheet of thermoplastic material onto said base sheet of thermoplastic material, cutting a plurality of discrete elongated stitch sections in said cover sheet, simultaneously forming a plurality of equally spaced apertures in said base sheet and embedding the adjacent end portions of each pair of adjacent stitch sections into one of the apertures formed in said base sheet, bonding each stitch section along its length to said base sheet, and removing the cover sheet from the base sheet so as to reveal the simulated stitches.

2. A method of forming simulated stitching on a base sheet of thermoplastic material having an upper surface and a lower surface, comprising the steps of positioning a cover sheet of thermoplastic material in contact with the upper surface of the base sheet of thermoplastic material, cutting a plurality of discrete elongated stitch sections of equal length in an aligned pattern in said cover sheet, simultaneously forming a plurality of equally spaced apertures in said upper surface of the base sheet and embedding the adjacent end portions of each adjacent pair of stitch sections into one of the apertures formed in said upper surface of the base sheet, applying heat to said stitch sections so as to fuse each stitch section along its length to said upper surface of the base sheet, and removing the cover sheet from the base sheet so as to reveal the simulated stitches.

3. A method of forming simulated stitching on a base sheet of thermoplastic material using a die blade having a plurality of stitch designs formed therein, each stitch design having a pair of laterally spaced and parallel cutting edges joined to a pair of projections, the method comprising the steps of positioning a cover sheet of thermoplastic material onto said base sheet of thermoplastic material, pressing the die blade into the cover sheet with sufficient pressure so as to cause the cutting edges and the projections to cut a plurality of discrete elongated stitch sections out of said cover sheet, simultaneously forming a plurality of equally spaced apertures in said base sheet and embedding the adjacent end portions of each adjacent pair of stitch sections into one of the apertures formed by the projections in said base sheet so as to form a series of stitch sections positioned end to end, heating the die blade to a temperature sufficient to fuse each stitch section along its length to said base sheet, and removing the cover sheet from the base sheet so as to reveal the simulated stitches.

* * * * *